United States Patent
Revital et al.

(10) Patent No.: US 7,379,548 B2
(45) Date of Patent: May 27, 2008

(54) VIRTUAL SMART CARD DEVICE, METHOD AND SYSTEM

(75) Inventors: Dan Revital, Jerusalem (IL); David S. Chechik, Jerusalem (IL); Carmi Bogot, Jerusalem (IL); Yossi Tsuria, Jerusalem (IL)

(73) Assignee: NDS Limited, Middlesex (GB)

( * ) Notice: Subject to any disclaimer, the term of this patent is extended or adjusted under 35 U.S.C. 154(b) by 1120 days.

(21) Appl. No.: 10/713,896

(22) Filed: Jan. 31, 2003

(65) Prior Publication Data

US 2004/0168063 A1    Aug. 26, 2004

(51) Int. Cl.
*H04N 7/167* (2006.01)
*H04L 9/00* (2006.01)
*H04K 1/00* (2006.01)
*H04N 7/173* (2006.01)
*H04N 7/16* (2006.01)

(52) U.S. Cl. .................. 380/240; 380/45; 380/281; 726/1; 726/2; 726/3; 726/4; 726/5; 713/165; 713/167; 725/100; 725/114; 725/139; 725/144

(58) Field of Classification Search .......... 380/240, 380/281, 45; 726/1–5; 713/165, 167; 725/100, 725/139, 144
See application file for complete search history.

(56) References Cited

U.S. PATENT DOCUMENTS

| | | | |
|---|---|---|---|
| 5,282,249 A | 1/1994 | Cohen et al. | |
| 5,355,413 A * | 10/1994 | Ohno | 713/159 |
| 5,481,609 A | 1/1996 | Cohen et al. | |
| 5,991,400 A | 11/1999 | Kamperman | |
| 6,160,890 A | 12/2000 | Tatebayashi et al. | |
| 6,178,242 B1 | 1/2001 | Tsuria | |
| 6,292,568 B1 | 9/2001 | Akins, III et al. | |
| 6,327,652 B1 * | 12/2001 | England et al. | 713/2 |
| 6,636,968 B1 * | 10/2003 | Rosner et al. | 713/178 |
| 6,971,008 B2 * | 11/2005 | Wasilewski et al. | 713/168 |
| 7,062,658 B1 * | 6/2006 | Cheriton et al. | 713/189 |
| 2002/0116622 A1 * | 8/2002 | Okaue et al. | 713/189 |
| 2003/0037237 A1 | 2/2003 | Abgrall et al. | |
| 2003/0142826 A1 * | 7/2003 | Asano | 380/277 |
| 2003/0154404 A1 * | 8/2003 | Beadles et al. | 713/201 |
| 2004/0003008 A1 * | 1/2004 | Wasilewski et al. | 707/200 |

FOREIGN PATENT DOCUMENTS

| | | |
|---|---|---|
| EP | 1 083 749 | 3/2001 |
| EP | 1 162 843 | 12/2001 |
| JP | 2002312242 | 10/2002 |

OTHER PUBLICATIONS

"Functional Model of a Conditional Access System", EBU Review Technical, No. 266, 1995.

* cited by examiner

*Primary Examiner*—Ayaz Sheikh
*Assistant Examiner*—Trang Doan
(74) *Attorney, Agent, or Firm*—Welsch & Katz, Ltd.

(57) ABSTRACT

A system and a method for secure transmission of protected content to a subscriber, without requiring a smart card or other renewable security element to be in physical proximity of the recipient module of the subscriber, such as a set-top box for example. Therefore, the renewable security element may optionally be protected and controlled by the transmitter of the protected content, such as by the broadcaster for example.

34 Claims, 11 Drawing Sheets

VIRTUAL SMART CARD DEVICE, METHOD AND SYSTEM

RELATED PATENT APPLICATION

This application is a Conversion of Provisional Patent Application Ser. No. 60/443,859 filed Jan. 31, 2003.

FIELD OF THE INVENTION

The present invention relates to protecting content for transmission to a recipient, and in particular to those devices, systems and methods which protect content with a secure channel for transmission.

BACKGROUND OF THE INVENTION

Digital content can easily and efficiently be delivered through any type of suitable network, such as a cable network, satellite and/or a computer network. Frequently, digital content is broadcast or multicast to many end users over the network. Optionally, digital content can also be efficiently delivered to individual users upon request.

However, in order for digital content to be effectively delivered to users in the context of usage rights or a commerce system, a number of mechanisms need to be provided. In particular, the digital content should be secure against theft, such that only authorized users can retrieve and consume the digital content. Furthermore, access to the digital content needs to be controlled, both against unauthorized use and also optionally to permit access to be linked to other mechanisms, such as payment schemes for example. Other types of control may include determination of an expiration time and date, limitations on the number of displays, and so forth. Such control of the access to the digital content may be generally described as digital rights management.

Failure to protect "Digital Rights" is more damaging than infringement of the same rights when applied to older, "analog" content. The reason is that older forms of content storage and transmission are subject to "generational degradation", where each processing step decreases the quality of the next generation of the product. Digital systems do not, in the main, suffer from such generational degradation. Pirated content may therefore offer exactly the same quality as original material, such that unauthorized users may more effectively infringe digital rights with copied material.

The term "digital rights management" may optionally cover a multitude of rights, which are granted to authorized users. These rights are defined according to a plurality of rules, which regulate the circumstances under which a user is authorized to access the content. These rights may include viewing the content, storing the content, reproduction of the content, excerpting portions of the content, modifying the content, copyrights, access/usage rights, resell/transferring and so forth. These rights may be divided into a number of different phases including specification, packaging (binding the rights to content), delivery, and enforcement in the consumption environment.

Even an authorized user may have only a portion of these rights; for example, the user may be authorized to view and store the content, but not reproduce or modify the content.

In order to prevent unauthorized users from abusing these usage rights, and/or to prevent authorized users from unauthorized use of the rights, the digital content should be protected by some type of security mechanism. Examples of security mechanisms include, but are not limited to, encryption and scrambling of the content. U.S. Pat. Nos. 5,282,249 and 5,481,609 to Cohen et al., which are hereby incorporated by reference as if fully set forth herein, disclose one exemplary system, which enables secure content to be broadcast widely, yet only to be played back or otherwise displayed by authorized users. This signal could contain a television program for example. The signal is scrambled, such that the authorized users are able to unscramble the signal and play back or otherwise display the media content only with the proper security device, such as a smart card for example. Thus, widely received media content is still protected from access by unauthorized users.

The scrambled television data streams described in U.S. Pat. Nos. 5,282,249 and 5,481,609 feature both scrambled data representing television signals and coded control messages, also known as ECMs. These ECMs contain, in a coded form, data necessary for generating a control word (CW) which may be used to descramble the scrambled data representing television signals.

While U.S. Pat. Nos. 5,282,249 and 5,481,609 describe an analog system, that is, a system in which analog television data streams are broadcast to television sets, it is appreciated that similar ECM methods may also be used for digital television data streams. Generally, the scrambling techniques used for scrambling analog television signals such as, for example, the well-known "cut-and-rotate" technique, are chosen for their particular applicability to analog signals. However, scrambling of digital television signals preferably employs other techniques, which are well-known in the art and which are more appropriate to digital signals. One example of such a technique is the application of the well-known DES algorithm to the digital television signals.

Methods of transmitting a scrambled digital signal, including ECMs, are described in the MPEG-2 standard, ISO/IEC 13818-1, 15 Apr. 1996 and subsequent editions.

Another attempted solution to the problem of content protection is described in published European Patent Application No. EP 0858184 and corresponding U.S. Pat. No. 6,178,242, which disclose a digital recording protection system and which are hereby incorporated by reference as if fully set forth herein. The disclosed system enables the digital content to be sent in a scrambled format, such that the digital content cannot be read and/or displayed without a key. The key is obtained from a control message, which is only sent to authorized users. Preferably, the key is obtained from coded information contained within the Entitlement Control Message, or ECM, for generating a code word associated with the ECM. Thus, only authorized users are able to correctly read and/or display the digital content.

In addition, the system and method described in European Patent Application No. EP 0858184 enable the authorized user to record and playback or otherwise display the digital content, while preventing the user from producing and distributing multiple playable copies of the digital content to other, non-authorized users. Therefore, the authorized user is able to fully use and enjoy the digital content, while the content itself is still protected from unauthorized use.

As described in European Patent Application No. EP 0858184, and as shown in background art FIG. 1 taken from this Application, such a system includes a media device 100, such as a television set, for playing the digital content, such as a television program for example. Media device 100 is connected to an integrated receiver-decoder (IRD) 110, for receiving and decoding the scrambled digital content. The system also features a removable security element 120, such as a smart card for example, for providing control words for unscrambling, or otherwise rendering into a clear format, the scrambled digital content by IRD 110. In addition, the system features a digital VCR 130 for communicating with media device 100 and IRD 110. Digital VCR 130 is able to record the digital content for later playback and/or display by media device 100.

IRD 110 receives scrambled digital content which features a plurality of ECMs, each of which is associated with, and is typically followed by, a scrambled digital data segment, containing the actual digital content. Each ECM includes coded information which can be used to generate a code word for unscrambling the associated scrambled digital data segment. Typically, removable security element 120 generates the code word. IRD 110 is then able to descramble the scrambled digital content, for example for being played by media device 100.

Background art FIG. 2, also taken from European Patent Application No. EP 0858184, is a flow diagram illustrating the production of the scrambled digital content. As shown, the scrambled digital content is produced as an SDDS (scrambled digital data stream) 140, featuring a plurality of ECMs such as an nth ECM 145, and a plurality of associated SDSEGs such as an nth SDSEG (scrambled digital data segment) 150 which is associated with nth ECM 145. IRD 110 of FIG. 1, in cooperation with removable security element 120, is able to use SDDS 140 in order to form a recording SDDS 165. Recording SDDS 165 is produced with the addition of a TECM (transformed ECM) key, which is permanently associated with the system of FIG. 1, even if removable security element 120 is changed, replaced or exchanged, for example. This TECM key is used to make a plurality of TECMs, shown as nth TECM 175, from the code words of the ECMs. Thus, a system which did not feature the correct TECM key could not descramble the recording SDDS 165 for playing back or otherwise displaying the digital content, while the authorized user is always able to play back or otherwise display the recorded digital content as long as the TECM key is available.

One significant difference between these types of conditional access and other currently available conditional access mechanisms, is that the latter mechanisms presently rely upon a personal key that is permanently embedded in the set-top box of the user. This key enables the set-top box to decrypt permission messages for accessing (reading and/or displaying) content. However, the key cannot be renewed or altered, since it is permanently encoded in the set-top box hardware. Therefore, it is vulnerable to "sniffing" and/or otherwise being hacked.

By contrast, the previously described mechanisms (as shown for example with regard to background art FIGS. 1 and 2) do not rely upon a key being permanently stored in the set-top box. Instead, the key is stored in the removable security element, such as a smart card for example. Therefore, the key is renewable, yet can be individualized to each subscriber. This smart card itself is also vulnerable to "hacking", as for any type of digital security mechanism, but is less vulnerable than mechanisms which rely upon a permanently embedded key.

SUMMARY OF THE INVENTION

The previously described background art mechanisms are vulnerable to being hacked, although the degree and type of vulnerability may vary. At least part of their vulnerability stems from the requirement that the key for decrypting content be maintained in or near the set-top box. Even when such a key is not contained within the set-top box itself, it must be in close physical proximity to the set-top box. This proximity is both for convenience but also for security; transmitting open or unencrypted content, and/or keys to such content, over an open network is clearly undesirable. However, such at least close physical proximity also renders the storage device that contains the key more vulnerable to hacking by individual subscribers, who may then choose to use this knowledge to support unauthorized access to the content. The background art does not teach or suggest a mechanism for solving this problem. The background art also does not provide a solution which both enables the key to be stored remotely from the set-top box, while still providing a secure connection to the set-top box which must use this key in order to decrypt or otherwise access content.

The present invention, in preferred embodiments thereof, seeks to overcome these disadvantages of the background art by providing a device, system and method for secure transmission of protected content to a subscriber, without requiring a smart card or other renewable security element to be in physical proximity of the recipient module of the subscriber, such as a set-top box for example. Instead, the protected content is transmitted securely to the subscriber through the combination of a multiple key hierarchy and a secure channel for transmission of the content. Preferably, the present invention uses a permanently stored secret at the recipient module in order to create the secure channel.

Alternatively or additionally, the present invention may also be implemented with a remote renewable security element for handling one or more renewable keys, and a permanently stored secret at the recipient module. The secret is preferably used to protect the one or more renewable keys, which in turn are used (singly or preferably as part of a multiple key hierarchy) to protect the content for transmission.

Therefore, the renewable security element may optionally be protected and controlled by the transmitter of the protected content, such as by the broadcaster for example.

Preferably, the recipient module has a secret which is embedded during manufacture, more preferably in hardware. This secret is preferably never transmitted in the clear, yet may be used as the basis for secure transmissions between the recipient module and the remote renewable security element.

The remote renewable security element may optionally store an encrypted key, which has preferably been encrypted with the secret (the remote renewable security element itself may optionally only receive the encrypted key, and may not have the secret). The secret itself is preferably unique, so that only the recipient module containing the secret can decrypt the encrypted key, and so access the protected content. This encrypted key is preferably capable of being renewed. Also, optionally and preferably, the encrypted key that is encrypted with the secret is not used directly to access the protected content, but rather is preferably used as part of a multiple key hierarchy which ultimately enables authorized subscribers to access the protected content through the recipient module.

The remote renewable security element preferably includes an encryption mechanism for encrypting one or more keys. For a multiple key hierarchy, preferably the remote renewable security element is capable of encrypting at least one key in the hierarchy, but more preferably is capable of encrypting a plurality of such keys.

According to preferred embodiments of the present invention, the remote renewable security element preferably encrypts at least one key, more preferably according to at least one additional key, in order to form the key hierarchy. However, the remote renewable security element preferably passes each encrypted key that is to be sent to the recipient module, to a security server. The security server then preferably sends the encrypted keys, optionally with other data, in a message.

More preferably, the security server transmits two layers of keys in the key hierarchy, most preferably over the secure channel. The first layer concerns the type of services (accesses to protected content) to which the recipient module is entitled. The second layer provides access to particular items or portions of protected content. The keys from the first layer are preferably required in order to decrypt and use the keys in the second layer. Optionally and preferably, the first layer of keys may be protected through encryption with a subscriber key. More preferably, the secure channel may optionally be implemented by encrypting the subscriber key with the secret that is stored in the recipient module.

According to an exemplary but preferred embodiment of the security server, the security server preferably receives an encrypted access key for being packaged as a VEMM message, for the first layer of keys in the preferred multiple key hierarchy. The VEMM preferably includes a reference to access criteria to be able to locate a key for accessing content, and therefore also at least partially determines whether the recipient module is authorized to access the protected content.

Optionally and more preferably, a new and different VEMM is transmitted if the recipient module is off-line for at least a predetermined period of time, as long as the previous epoch has ended when the recipient module goes on-line again.

According to preferred embodiments of the present invention, there is a plurality of recipient modules, such that the VEMM is unicast to each of a subset of the plurality of recipient modules.

For the second layer of the key hierarchy, preferably an encrypted control word is prepared. The control word is preferably required for the recipient module to be able to access the protected content, and is preferably encrypted with the access key. Therefore, the encrypted control word may be described as being indirectly capable of being decrypted with the secret, since upper layer(s) of the key hierarchy is preferably required to be received and decrypted before the recipient module is able to decrypt the control word.

The security server preferably prepares a VECM with the encrypted control word and an access criteria reference. This reference enables the recipient module to determine which access key may be used to access the encrypted control word. If the recipient module is not authorized to access this particular protected content, then the recipient module does not have the key to which the reference is being made, and so optionally does not further process the VECM. Optionally, the recipient module displays the proper error code and/or other status information if access is not authorized.

According to preferred embodiments of the present invention, the recipient module includes at least one permanent read-only storage medium for storing the secret, onto which the secret is more preferably burnt during manufacture. This storage medium may optionally be part of a generic set-top box chip set, which features MPEG de-multiplexing and decoding, as well as other common set-top box chip set features.

According to preferred embodiments of the present invention, a plurality of remote renewable security elements is preferably controlled by the broadcaster of the protected content. More preferably, the broadcaster features a head-end that includes a security server. The security server then preferably controls the plurality of remote renewable security elements.

According to other optional but preferred embodiments of the present invention, the security server and the plurality of remote renewable security elements share a server key. Transmissions between the remote renewable security elements and the security server may then optionally be encrypted with the server key, such as the access key for example.

According to other preferred embodiments of the present invention, at least one encrypted key from the multiple key hierarchy is transmitted upon receipt of a request from the recipient module. For example, the recipient module requests the protected content from the broadcast head-end, such that the remote renewable security element receives a request for the protected content from the recipient module and prepares at least one encrypted key for transmission.

For example, if the recipient module receives a VECM with an access criteria reference that does not match a VEMM already received by the recipient module, indicating that the protected content associated with the VECM is available or is about to become available, the recipient module may optionally request the associated VEMM according to the access criteria reference. Without the VEMM, the recipient module cannot decrypt the control word to access the protected content.

Such a situation may occur, for example, according to the optional but preferred embodiment of VOD (video on demand). For this embodiment, the VEMM is preferably not sent in advance. Instead, only the VECM is sent. If the subscriber decides to access protected content associated with the VECM, then the recipient module requests a VEMM. The VEMM is preferably not prepared in advance. Instead, once the request for the VEMM is received (in the example below, by the security server), a VEMM is preferably immediately prepared and sent to the recipient module. For this embodiment, the "epoch", or time period for which the VEMM is operative, preferably starts as soon as the VEMM is prepared.

It will be appreciated that the above functions and embodiments are in no way intended to be limiting and may optionally and preferably coexist simultaneously in any appropriate configuration, including or excluding any of the above and in any combination thereof.

In addition the present invention could be implemented as software, hardware or any appropriate combination thereof. For any of these implementations, the functional stages performed by the method could be described as a plurality of logical processes implementable in any suitable programming language or any form of circuitry with such functionality.

It should be noted that the words "user" and "subscriber" are used interchangeably, except where otherwise noted.

It should be noted that the term "generic chip" may also optionally refer to a generic chip set. Furthermore, the term "generic chip" refers to any chip or set thereof capable of being manufactured according to mass-production techniques and/or to any such chip that is at least technically similar to other chips, such that preferably the only unique element is the presence of a secret. These chips are preferably commercially available chips which may optionally be based upon any set top box chip set, which are capable of decryption and of containing a secret. Preferably, the set-top box chip set features MPEG de-multiplexing and decoding, as well as other common set-top box chip set features, and the secret itself.

Hereinafter, the term "accessing content" refers to reading and/or displaying and/or playing back the content, and/or otherwise manipulating the content in some manner.

It should be noted that although the "broadcaster" may be stated to transmit the protected content and/or any type of access permission and/or key to the recipient, such as a recipient module for example, the term "broadcaster" is being used to generally describe any element of a system that transmits any type of information and/or data to the recipient. In fact, these different elements may optionally be distributed between different entities, as described in greater detail below in the preferred embodiments of the invention.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
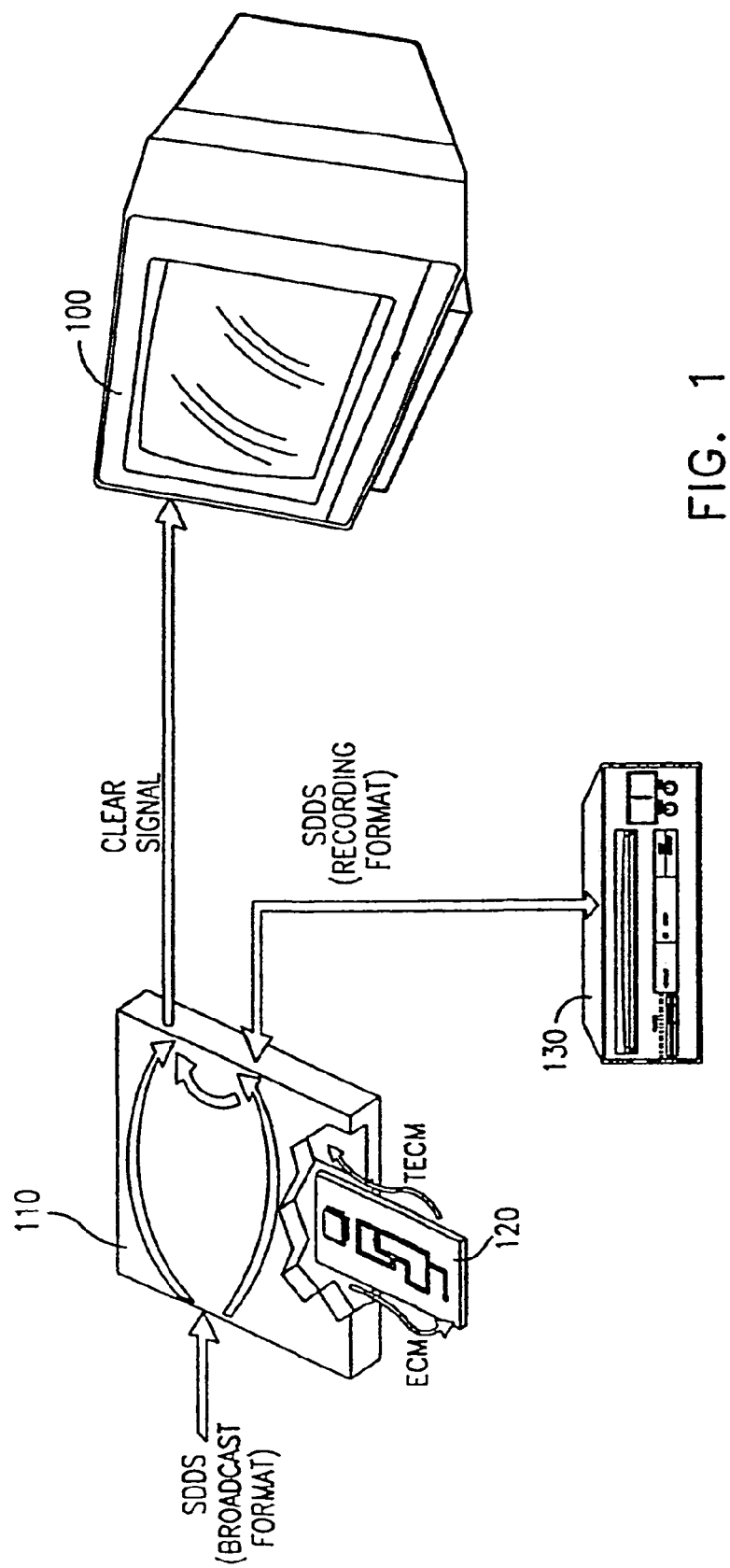
FIG. 1 is a block diagram of a system according to the background art.
Figure 2:
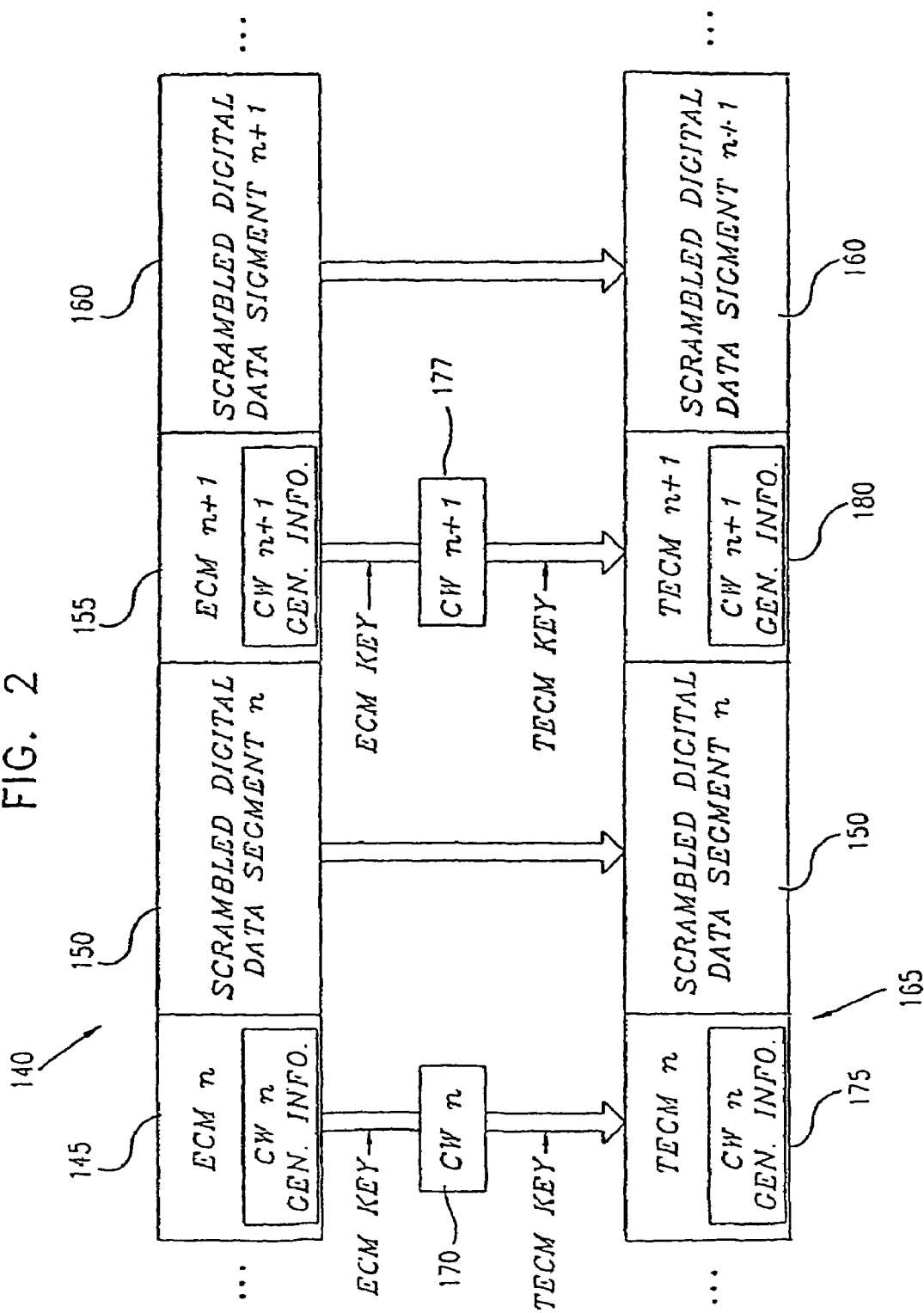
FIG. 2 is a flow diagram according to the background art.

The present invention, in preferred embodiments thereof, seeks to overcome these disadvantages of the background art by providing a device, system and method for secure transmission of protected content to a subscriber, without requiring a smart card or other renewable security element to be in physical proximity of the recipient module of the subscriber, such as a set-top box for example. Instead, the protected content is transmitted securely to the subscriber through the combination of a multiple key hierarchy and a secure channel for transmission of the content. Preferably, the present invention uses a permanently stored secret at the recipient module in order to create the secure channel.

Alternatively or additionally, the present invention may also be implemented with a remote renewable security element for handling one or more renewable keys, and a permanently stored secret at the recipient module. The secret is preferably used to protect the one or more renewable keys, which in turn are used (singly or preferably as part of a multiple key hierarchy) to protect the content for transmission.

Therefore, the renewable security element may optionally be protected and controlled by the transmitter of the protected content, such as by the broadcaster for example.

Preferably, the recipient module has a secret which is embedded during manufacture, more preferably in hardware. This secret is preferably never transmitted in the clear, yet may be used as the basis for secure transmissions between the recipient module and the remote renewable security element.

The remote renewable security element may optionally store an encrypted key, which has preferably been encrypted with the secret (the remote renewable security element itself may optionally only receive the encrypted key, and may not have the secret). The secret itself is preferably unique, so that only the recipient module containing the secret can decrypt the encrypted key, and so access the protected content. This encrypted key is preferably capable of being renewed. Also, optionally and preferably, the encrypted key that is encrypted with the secret is not used directly to access the protected content, but rather is preferably used as part of a multiple key hierarchy which ultimately enables authorized subscribers to access the protected content through the recipient module.

The remote renewable security element preferably includes an encryption mechanism for encrypting one or more keys. For a multiple key hierarchy, preferably the remote renewable security element is capable of encrypting at least one key in the hierarchy, but more preferably is capable of encrypting a plurality of such keys.

According to preferred embodiments of the present invention, the remote renewable security element preferably encrypts at least one key, more preferably according to at least one additional key, in order to form the key hierarchy. However, the remote renewable security element preferably passes each encrypted key that is to be sent to the recipient module, to a security server. The security server then preferably sends the encrypted keys, optionally with other data, in a message.

More preferably, the security server transmits two layers of keys in the key hierarchy, most preferably over the secure channel. The first layer concerns the type of services (accesses to protected content) to which the recipient module is entitled. The second layer provides access to particular items or portions of protected content. The keys from the first layer are preferably required in order to decrypt and use the keys in the second layer. Optionally and preferably, the first layer of keys may be protected through encryption with a subscriber key. More preferably, the secure channel may optionally be implemented by encrypting the subscriber key with the secret that is stored in the recipient module.

According to an exemplary but preferred embodiment of the security server, the security server preferably receives an encrypted access key for being packaged as a VEMM message, for the first layer of keys in the preferred multiple key hierarchy. The VEMM preferably includes an access criteria reference and a key.

Optionally and more preferably, a new and different VEMM is transmitted if the recipient module is off-line for at least a predetermined period of time, as long as the previous epoch has ended when the recipient module goes on-line again.

According to preferred embodiments of the present invention, there is a plurality of recipient modules, such that the VEMM is unicast to a subset of the plurality of recipient modules.

For the second layer of the key hierarchy, preferably an encrypted control word is prepared. The control word is preferably required for the recipient module to be able to access the protected content, and is preferably encrypted with the access key. Therefore, the encrypted control word may be described as being indirectly capable of being decrypted with the secret, since upper layer(s) of the key hierarchy is preferably required to be received and decrypted before the recipient module is able to decrypt the control word.

The security server preferably prepares a VECM with the encrypted control word and an access criteria reference. This reference enables the recipient module to determine which access key may be used to access the encrypted control word. If the recipient module is not authorized to access this particular protected content, then the recipient module does not have the key to which the reference is being made, and so optionally does not further process the VECM. Optionally, the recipient module displays the proper error code if access is not authorized.

According to preferred embodiments of the present invention, the recipient module includes at least one permanent read-only storage medium for storing the secret, onto which the secret is more preferably burnt during manufacture. This storage medium may optionally be part of a generic chip set, which features generic technology, apart from the secret itself.

According to preferred embodiments of the present invention, a plurality of remote renewable security elements is preferably controlled by the broadcaster of the protected content. More preferably, the broadcaster features a head-end that includes a security server. The security server then preferably controls the plurality of remote renewable security elements.

According to other optional but preferred embodiments of the present invention, the security server and the plurality of remote renewable security elements share a server key. Transmissions between the remote renewable security elements and the security server may then optionally be encrypted with the server key, such as the access key for example.

According to other preferred embodiments of the present invention, at least one encrypted key from the multiple key hierarchy is transmitted upon receipt of a request from the recipient module. For example, the recipient module requests the protected content from the broadcast head-end, such that the remote renewable security element receives a request for the protected content from the recipient module and prepares at least one encrypted key for transmission.

According to preferred embodiments of the present invention, the system described below is preferably implemented with redundant components, particularly for those components that may act as bottlenecks for further actions.

It should be noted that optionally any suitable encryption mechanism may be used for encrypting the various types of keys in the present invention, including the control word for example. Illustrative examples of such encryption mechanisms include but are not limited to, triple DES and AES.

The principles and operation of the present invention may be better understood with reference to the drawings and the accompanying description.

Figure 3:
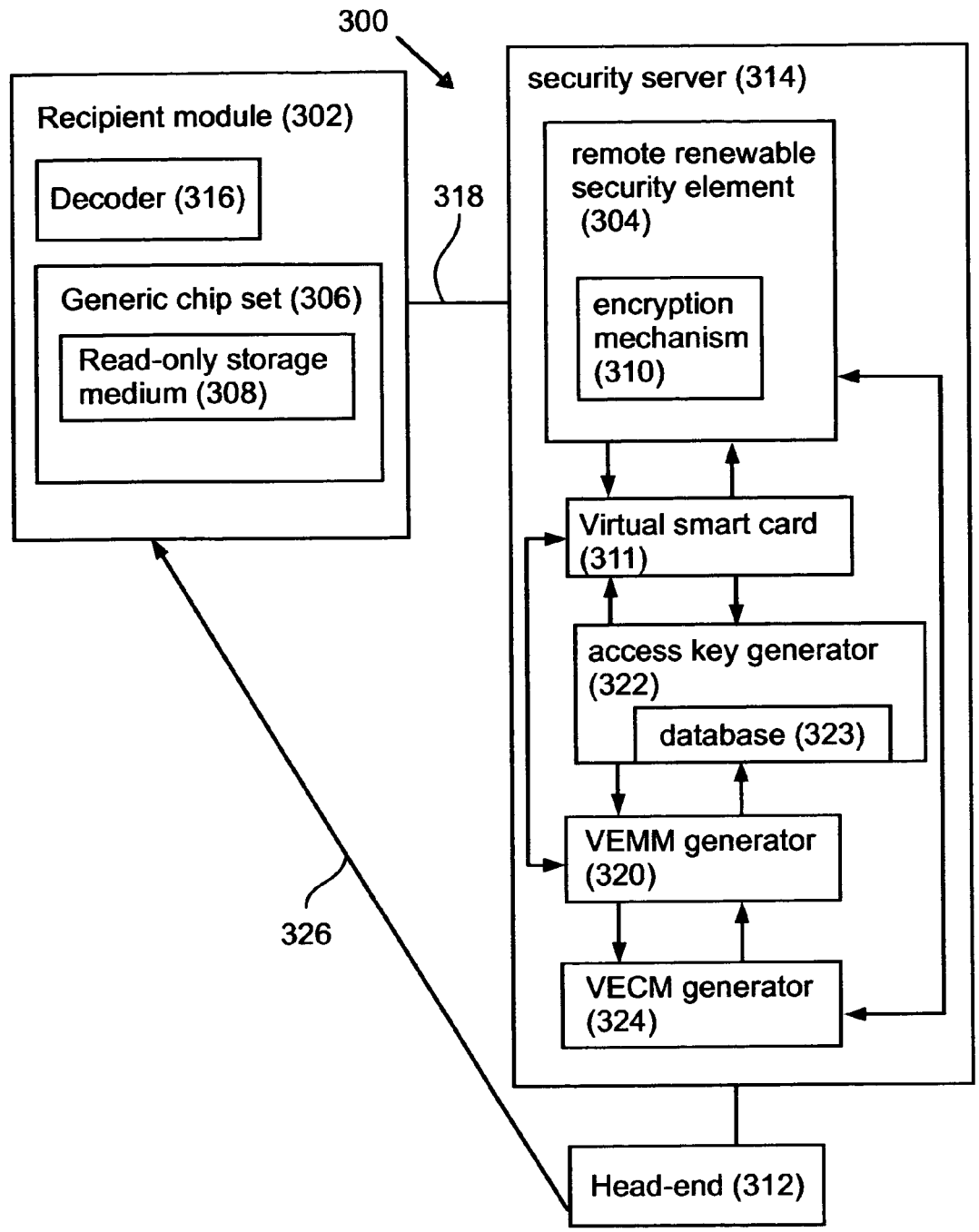
FIG. 3 is an exemplary block diagram of a system according to the present invention.

Reference is now made to FIG. 3, showing a simplified block diagram illustration of a system 300 according to the present invention, including a recipient module 302 and a remote renewable security element 304. Recipient module 302 is capable of receiving protected content, as described in greater detail below, and if authorization is given, of accessing the protected content. According to preferred embodiments of the present invention, such protected content preferably comprises at least one of multimedia data, video data or audio data, or a combination thereof. Of course, any type of data may optionally be included in the protected content.

In order for authorization to be granted, so that recipient module 302 is able to access the protected content, system 300 features remote renewable security element 304. Remote renewable security element 304 is preferably capable of storing an encrypted key, for being transmitted to recipient module 302. This encrypted key is preferably required to be decrypted by recipient module 302, after which recipient module 302 is preferably capable of using the key to access the protected content. Therefore, recipient module 302 preferably also features a secret, which can optionally be used at least indirectly to decrypt the encrypted key. Preferably, the encrypted key is part of a multiple key hierarchy, such that preferably a plurality of keys must be decrypted before the protected content can be accessed.

This secret is preferably unique to each recipient module 302, and is more preferably stored on a generic chip set 306. Most preferably, generic chip set 306 features a read-only storage medium 308 for storing the secret. Generic chip set 306 may optionally comprise a single chip; however, generic chip set 306 is preferred for storage of the secret, because generic chip set 306 may optionally be manufactured as for any other type of chip set, by only changing the secret, such that preferably only the secret is unique. Therefore, generic chip set 306 may optionally and preferably feature generic technology, apart from the secret, thereby decreasing the cost of manufacture.

It should be noted that a similar implementation may optionally be used, without such a hardware-based storage solution, in which recipient module 302 features software for storing the secret.

Unlike the background art examples that were previously described, remote renewable security element 304 and recipient module 302 are preferably physically separated. Therefore, remote renewable security element 304 and recipient module 302 are preferably connected through a communication channel 318, which may optionally be implemented as a cable communication link according to DOCSIS for example.

Remote renewable security element 304 also preferably comprises an encryption mechanism 310, optionally for encrypting at least one key in the preferred key hierarchy. Although optionally remote renewable security element 304 may directly use the secret to encrypt at least one key, this option has the disadvantage of requiring the secret to be available to remote renewable security element 304, which may not be desirable. Therefore, more preferably, encryption mechanism 310 preferably receives at least one other key with which to perform the encryption. Most preferably, remote renewable security element 304 receives the additional key twice; once as the open key, which is ready to be used for encryption; and the second time as an encrypted key, which is most preferably already encrypted with the secret.

According to preferred embodiments of the present invention, rather than a single key being encrypted with the secret, preferably a multiple key hierarchy is created for accessing the protected content. For example, the multiple key hierarchy preferably contains at least two layers of keys: a first key, termed herein an access key, which may optionally determine access to a particular type of service or content; and a second key, termed herein a control word, which may optionally determine access to particular items or portions of content. In order to protect the multiple key hierarchy, optionally and preferably a secure channel is used, which may optionally be implemented with a secret stored in recipient module 302. As described in greater detail below, the secret may optionally be used to encrypt another, more general key, which is preferably required in order to access the multiple key hierarchy that is related to content.

In order to manage the preferred key hierarchy, remote renewable security element 304 is preferably in communication with a security server 314. Security server 314 preferably controls a plurality of remote renewable security elements 304 (not shown). An advantage of the present invention is that remote renewable security element 304 may optionally be under the direct physical control of the broadcaster through security server 314, as shown. For this preferred implementation, remote renewable security element 304 is not necessarily implemented as a smart card. Rather, a plurality of remote renewable security elements 304 is preferably constructed as a plurality of chips on a board, or even as a plurality of software elements being operated by one or more CPU's, although the former implementation is more preferred. The plurality of remote renewable security elements 304 may also optionally be constructed as a program in a field programmable gate array (FPGA). Also, optionally and preferably, security server 314 shares a server key with all remote renewable security elements 304 under the control of security server 314, for secure communication between these elements.

As part of the implementation shown, recipient module 302 is not necessarily identified with a particular subscriber. Instead, the subscriber is preferably identified with a subscriber key, while recipient module 302 has the associated secret. The subscriber key may optionally be required to be renewed or changed periodically, which can optionally be performed by giving the new subscriber key to remote renewable security element 304. Recipient module 302 is preferably able to use the secret to decrypt the subscriber key, and hence to further access the multiple key hierarchy. As previously described, this combination of secret and subscriber key is only one example of a secure channel according to the present invention.

According to optional but preferred embodiments of the present invention, the functions of remote renewable security module 304 may optionally be shared between remote renewable security module 304, preferably implemented as a smart card chip, and a virtual smart card 311, which is preferably implemented as software. This division is preferred because certain functions are preferably performed in hardware, both for reasons of speed and security, while other functions are more rapidly performed in software. Since security server 314 preferably controls both remote renewable security module 304 and virtual smart card 311, certain functions may optionally be implemented in software while still maintaining overall security.

In the embodiment shown in FIG. 3, security server 314 preferably receives an entitlement message from a head-end 312, which determines the type of service(s), such as the type(s) of protected content that each subscriber, and hence recipient module 302, is entitled to access. In order to be able to translate the entitlement message into a message for recipient module 302, security server 314 preferably features a VEMM generator 320, for generating a VEMM message. The VEMM message preferably contains an access key, optionally with an access criteria reference. The optional access criteria reference preferably enables recipient module 302 to determine which access key may be matched with which type of protected content. The access key is preferably transmitted in an encrypted form, more preferably encrypted with the subscriber key.

Optionally and preferably, in order to generate the VEMM message, security server 314, and more preferably VEMM generator 320, receives an EMM (Entitlement Management Message) from head-end 312. The EMM contains information that authorizes a receiver (in this example recipient module 302) to access the protected content. For this example, the EMM is transformed into a VEMM in order for recipient module 302 to be able to access the information.

Optionally, VEMM may include a plurality of encrypted access keys and access criteria references, for example for multiple portions or items of protected content.

According to the implementation shown, VEMM generator 320 preferably sends a request, more preferably periodically, to an access key generator 322 to generate an access key. Alternatively, VEMM generator 320 may not be the master component for security server 314. Access key generator 322 preferably encrypts the access key with the shared server key and returns the encrypted access key. Access key generator 322 also optionally and preferably stores the encrypted access key in a database 323, which may optionally be contained within access key generator 322 as shown, or may alternatively be located within security server 314 and accessible to other components of security server 314. Optionally one or more components of security server 314 may retrieve the access key directly from database 323, although as described below, alternatively the access key may be passed between these components as necessary.

VEMM generator 320 then preferably passes the encrypted access key to remote renewable security element 304. If remote renewable security element 304 determines that recipient module 302 is entitled to the content, then remote renewable security element 304 preferably encrypts the access key with the subscriber key. Alternatively, virtual smart card 311 may determine whether recipient module 302 is entitled to the content, and may then optionally and preferably instruct remote renewable security element 304 to encrypt the access key with the subscriber key, more preferably after decrypting the access key with the shared server key.

The encrypted access key is preferably returned to VEMM generator 320, which optionally and preferably packages the encrypted access key with the access criteria reference to form the VEMM. Optionally and more preferably, the VEMM also includes the encrypted subscriber key, which as previously described, is more preferably passed to security server 314 in an already encrypted form.

Once recipient module 302 receives the VEMM, preferably recipient module 302 decrypts the encrypted subscriber key with the secret stored in read-only storage medium 308. Recipient module 302 then preferably decrypts the access key with the subscriber key. The VEMM also contains information about the type of service(s) to which recipient module 302 is entitled, such as which item(s) of protected content may be accessed by recipient module 302, according to the access criteria reference. Optionally and preferably, if recipient module 302 is not authorized for a particular service, recipient module 302 rejects the VEMM.

Security server 314, and more preferably a VECM generator 324, now preferably receives an ECM (Entitlement Control Message) from head-end 312. The ECM preferably contains the necessary information to actually access a particular item or portion of content. More preferably, the ECM contains a control word that is required to access the protected content (or at least sufficient information to be able to generate such a control word), and an access criteria reference, which refers to the particular access key required to access the control word. VECM generator 324 preferably also receives the access key from access key generator 322, and uses the access key to encrypt the control word. Alternatively and preferably, VECM generator 324 instructs remote renewable security element 304 to generate the control word from the information contained in the ECM, for example through decryption, and then to encrypt the control word with the access key.

VECM generator 324 then preferably packages the encrypted control word, optionally with the access criteria reference, into a VECM for transmission to recipient module 302.

Security server 314 now preferably transmits the VECM to recipient module 302. Optionally and more preferably, the VECM is multicast to a plurality of recipient modules 302 (not shown). The VECM preferably includes the encrypted control word, the access criteria reference and the crypto-period index for matching between VECM and ECM. Recipient module 302 decrypts the encrypted control word, and preferably uses the control word to access the protected content. The access criteria reference contains the necessary information for recipient module 302 to be able to determine which access key is required for decrypting the encrypted control word.

Security server 314 may optionally be contained within head-end 312, or alternatively may be implemented as two separate entities, as shown. Regardless of the relative locations, the implementation shown in FIG. 3 has a number of advantages. For example, if security server 314 is stolen or otherwise compromised, recovery may be performed relatively quickly. Similarly, remote renewable security module 304 itself is much more difficult to steal or otherwise compromise, but if such an act were to occur, recovery can be performed more quickly and efficiently.

According to preferred embodiments of the present invention, as explained in greater detail below with regard to FIG. 6, the protected content is preferably transmitted to recipient module 302 by head-end 312 with the ECM, through the same broadcast channel (shown as a broadcast channel 326). The ECM is preferably sent to recipient module 302 in order to comply with the requirements of standards such as MPEG (Motion Picture Expert Group) protocols, which require the ECM to be sent with the content itself. For the preferred implementation of recipient module 302 in which it lacks a smart card as shown, recipient module 302 would not be able to access at least a portion of the information in the ECM.

Figure 4:
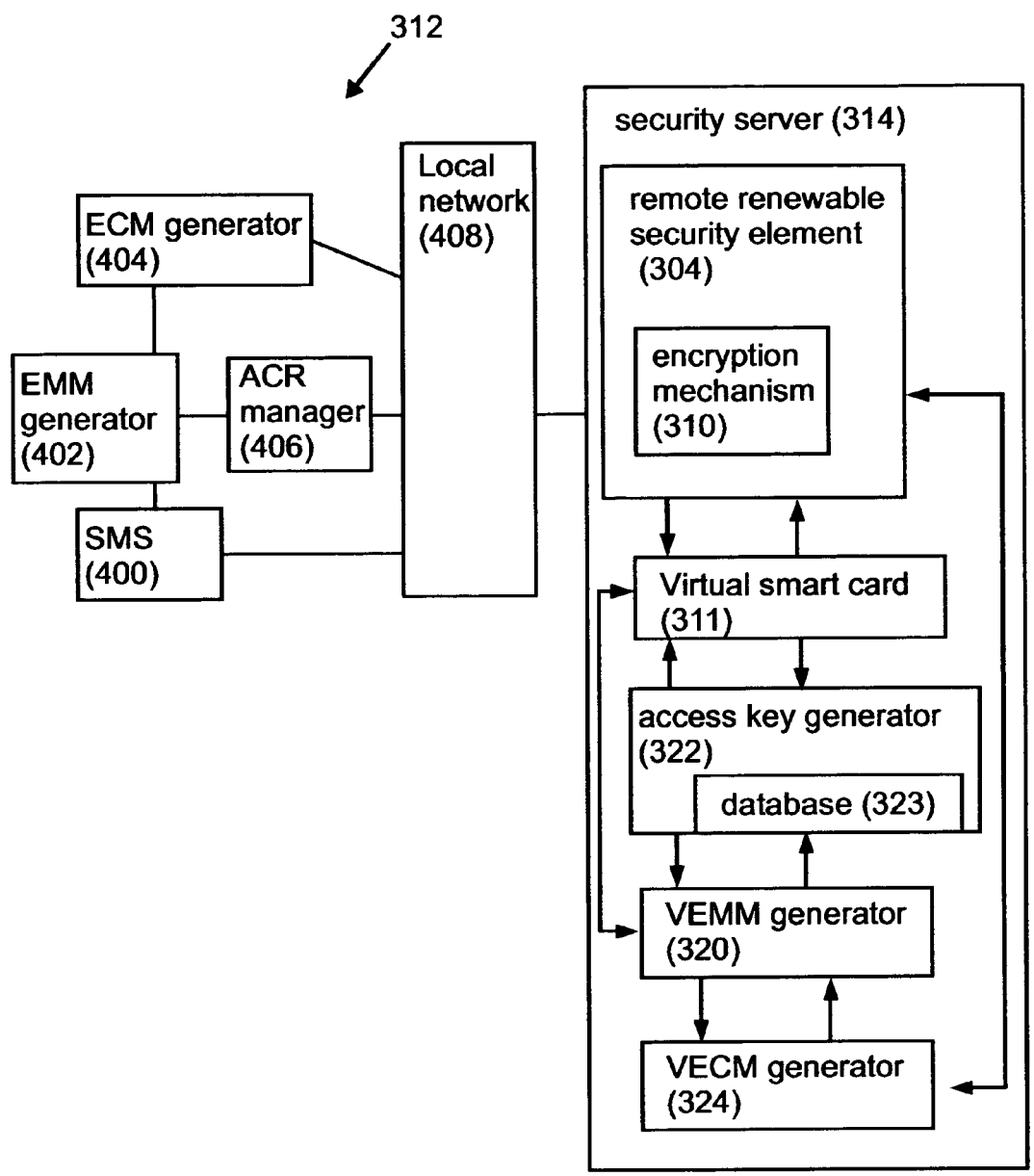
FIG. 4 shows a portion of the system of FIG. 3 in more detail, according to the present invention.

FIG. 4 shows head-end 312 in greater detail, with regard to the interactions with security server 314. As shown, head-end 312 optionally and preferably features a subscriber management system (SMS) 400, for managing the entitlements of each subscriber. These entitlements preferably determine which type(s) of content may be accessed by each subscriber. SMS 400 may also preferably manage subscription and other charges and payments.

SMS 400 then preferably communicates with an EMM generator 402, for generating EMM messages. As previously described, these messages include information about the content to which the subscriber may be given access, and are sent to VEMM generator 320 at security server 314. As previously described, ECM messages are preferably generated by an ECM generator 404 and are preferably sent to VECM generator 324. Each ECM message preferably includes a control word, or at least sufficient information to be able to generate the control word (for example by decryption) and also the access criteria reference, and optionally the cryptographic period (crypto-period) for which the ECM is valid. The crypto-period information is preferably present for matching the ECM to the VECM.

Since EMM messages preferably include an access criteria reference, head-end 312 also preferably includes an access criteria generator 406. Access criteria generator 406 preferably generates both the access criteria for the protected content, and the associated access criteria reference.

These portions of head-end 312 are preferably in communication with security server 314 through a local network 408, and in any case, may optionally be implemented according to the background art.

Figure 5:
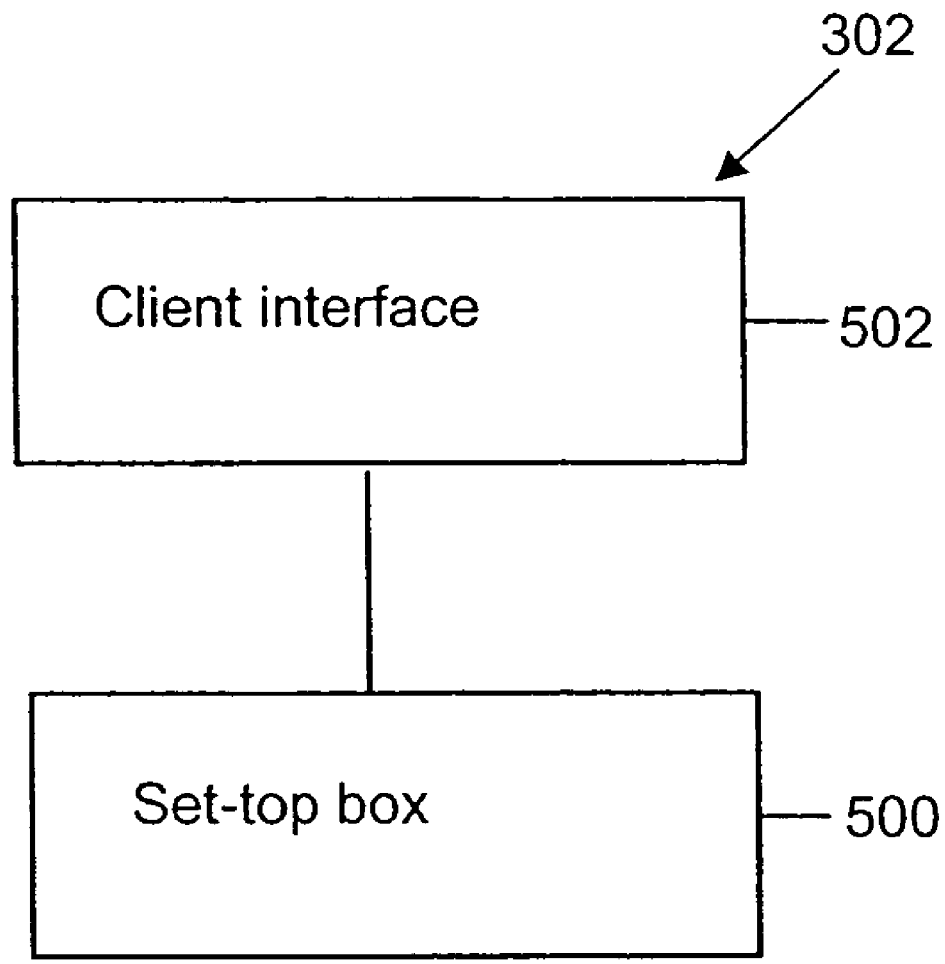
FIG. 5 shows the recipient module of FIG. 3 in more detail, according to the present invention.

FIG. 5 shows recipient module 302 in greater detail. As shown, recipient module 302 also optionally and preferably features a set-top box 500, and a client interface 502. Client interface 502 preferably provides at least some of the functionality for communication with system 300, which had previously been provided by the smart card itself in the background art.

The above-referenced description is preferably operable for two different situations, which may be termed "key-push" and "key-pull". For example, if system 300 is being used for distributing multimedia data, such as a television program for example, then recipient module 302 may optionally be offered access to the protected content, without first requesting such access. This offer is an example of "key-push", and may occur because of the scheduling of a television program for broadcast. The offer would enable recipient module 302 to be able to receive the broadcast program.

However, for pay-per-view or video-on-demand (both of which are examples of "key-pull"), in which the subscriber places a request for the television program through recipient module 302, optionally and preferably client interface 502 receives a description of one or more choices of content that are available. The subscriber then optionally selects one of the choices of content. Client interface 502 then preferably queries security server 314 (not shown; see FIG. 3) for purchase options. Security server 314 may optionally transfer the query to head-end 312 (not shown; see FIG. 3), but in any case preferably transmits the options to client interface 502. Client interface 502 preferably then requests one of these options, after which the process is performed substantially as described with regard to FIG. 3 above.

This embodiment may also optionally be implemented with FECM messages, which are "future" ECM messages. Preferably, the FECM does not contain the control word, or information sufficient to generate the control word, but rather provides sufficient information (such as the access criteria reference for example) to allow client interface 502 to order the associated protected content from security server 314.

A further optional but preferred embodiment of the present invention is for "polite push". According to this embodiment, recipient module 302 may optionally transmit at least one request for protected content to security server 314, after which further communication is "pushed" to recipient module 302.

Figure 6:
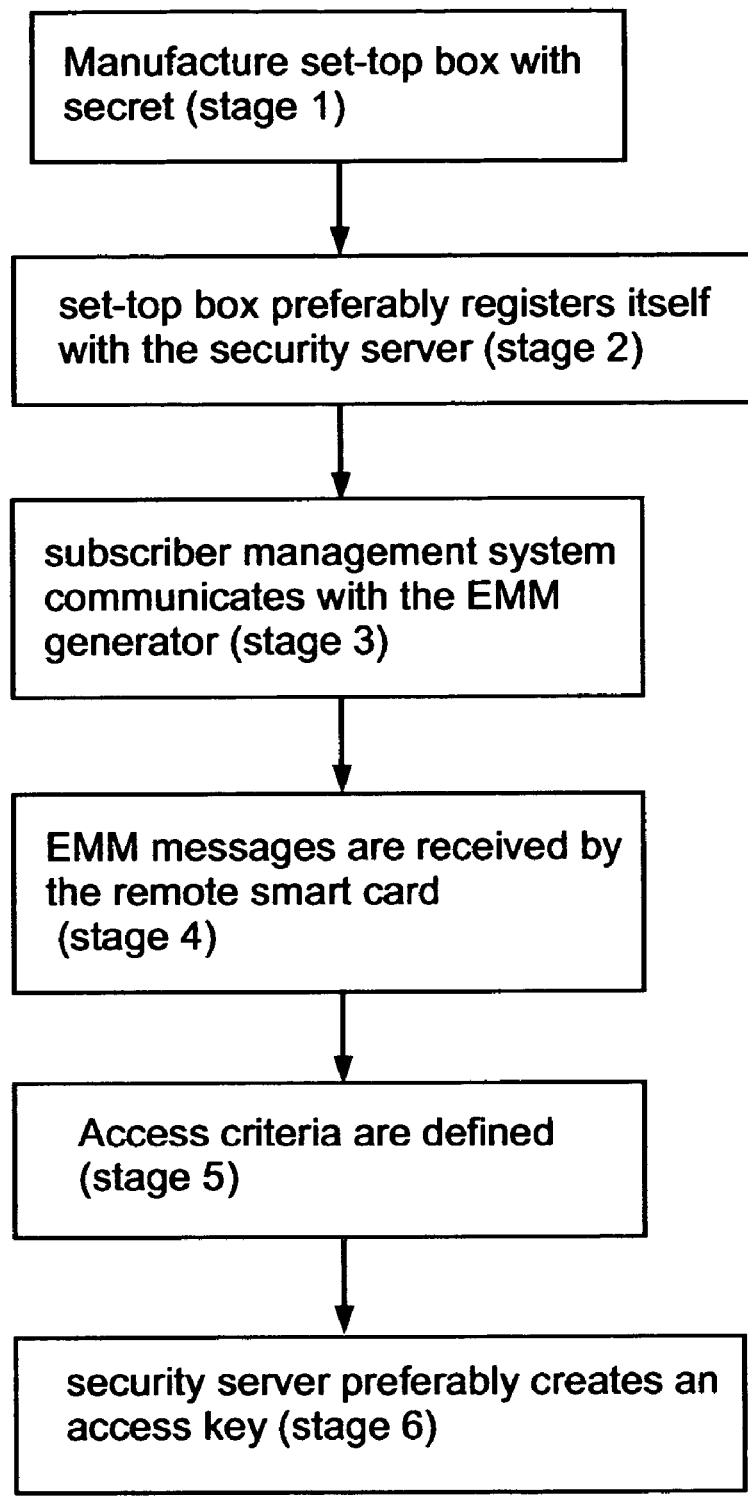
FIG. 6 is a flow chart of an exemplary method according to the present invention.
Figure 6:
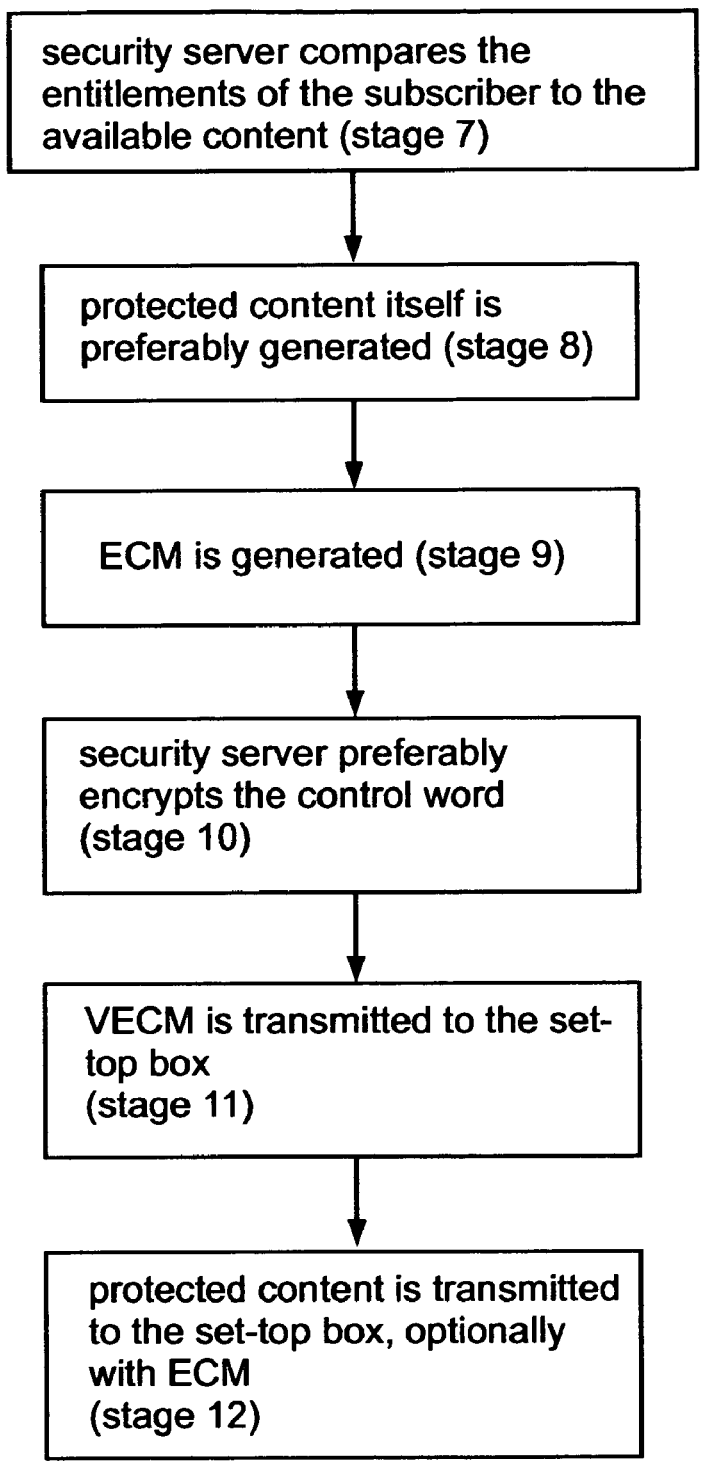

FIG. 6 shows a flowchart of an exemplary method according to the present invention. In stage 1, the recipient module, which optionally and preferably is a set-top box, is manufactured with a secret. The secret is preferably unique. Preferably, the secret is embedded in the hardware as previously described. More preferably, the set-top box is manufactured with generic technology as previously described, apart from the secret itself. Also more preferably, the set-top box receives an identifier. Optionally and more preferably, the head-end (or any other controlling unit) receives the secret. However, the secret is preferably never transmitted otherwise, to other components of the system.

Also optionally and preferably, during the manufacturing process or after, a subscriber key is created, which may optionally be a temporary subscriber key. This key is preferably encrypted with the secret. Also optionally and preferably, if the set-top box is to be controlled by a remote smart card that is part of a cluster controlled by a security server, then the subscriber key is preferably also encrypted with the shared server key. Both of these encrypted keys are preferably sent to the EMM generator.

In stage 2, the set-top box preferably registers itself with the security server. The security server then requests the encrypted subscriber key from the EMM generator. The registration is preferably reported to the subscriber management system.

In stage 3, the subscriber management system communicates with the EMM generator in order to manage the entitlements of the subscriber (the protected content to which the subscriber may be granted access). The EMM generator then creates the necessary EMM messages for updating the entitlements of the subscriber.

In stage 4, the EMM messages are received by the remote smart card that communicates with the set-top box. As previously described, the remote smart card is controlled by the security server.

In stage 5, for each item of protected content, preferably access criteria are defined, optionally by the access criteria manager (as shown with regard to FIG. 4). These access criteria may optionally be global (for example, related to geographical area, etc) or alternatively may be specific to a particular set-top box (for example, proof of purchase by the subscriber for particular content, such as pay-per-view for example). Each access criterion preferably has an associated access criteria reference. The access criteria reference and the access criteria are then preferably sent to the security server.

In stage 6, the security server preferably creates an access key, as described with regard to FIG. 3 in more detail. Each access key is preferably encrypted with the shared server key. More preferably, each access key is associated with one or more access criteria references. Most preferably, each access key is associated with a specific access criteria reference, and may therefore optionally be indexed by the access criteria reference for storage and retrieval.

In stage 7, the security server compares the entitlements of the subscriber to the available content. The latter is preferably determined according to the plurality of access criteria, while the former is preferably obtained from the subscriber management system. If the subscriber is entitled to particular protected content, then the encrypted access key (encrypted with the subscriber key) is obtained. In addition, the security server preferably prepares a VEMM as previously described.

In stage 8, the protected content itself is preferably generated by protecting content with a control word. The control word is preferably generated by the control word generator at the head-end, as described with regard to FIG. 4. Protecting the content preferably involves encrypting the content with the control word, although alternatively, other types of protection may optionally be contemplated.

In stage 9, the ECM generator preferably generates the ECM with the access criteria reference and the crypto-period index. The ECM and control word are then sent to the security server.

In stage 10, the security server preferably encrypts the control word with the access key, and then generates the VECM from the ECM and the encrypted control word. The VECM also preferably contains the crypto-period index, in order to be able to match the ECM to the VECM.

In stage 11, the VECM is transmitted to the set-top box. The set-top box then preferably decrypts the access key with the subscriber key; the subscriber key itself is preferably previously decrypted with the secret. The set-top box then preferably uses the access key to decrypt the control word, after which the set-top box may access the protected content.

In stage 12, protected content is transmitted to the set-top box, optionally with the ECM. The protected content may optionally be sent by the same channel as the VECM, but preferably is sent by a different channel. More preferably, the ECM is sent through the same channel as the protected content. The ECM is preferably sent to the set-top box in order to comply with the requirements of standards such as MPEG (Motion Picture Expert Group) protocols, which require the ECM to be sent with the content itself. For the preferred implementation of the set-top box in which it lacks a smart card, the set-top box would not be able to access at least a portion of the information in the ECM.

Figure 7:
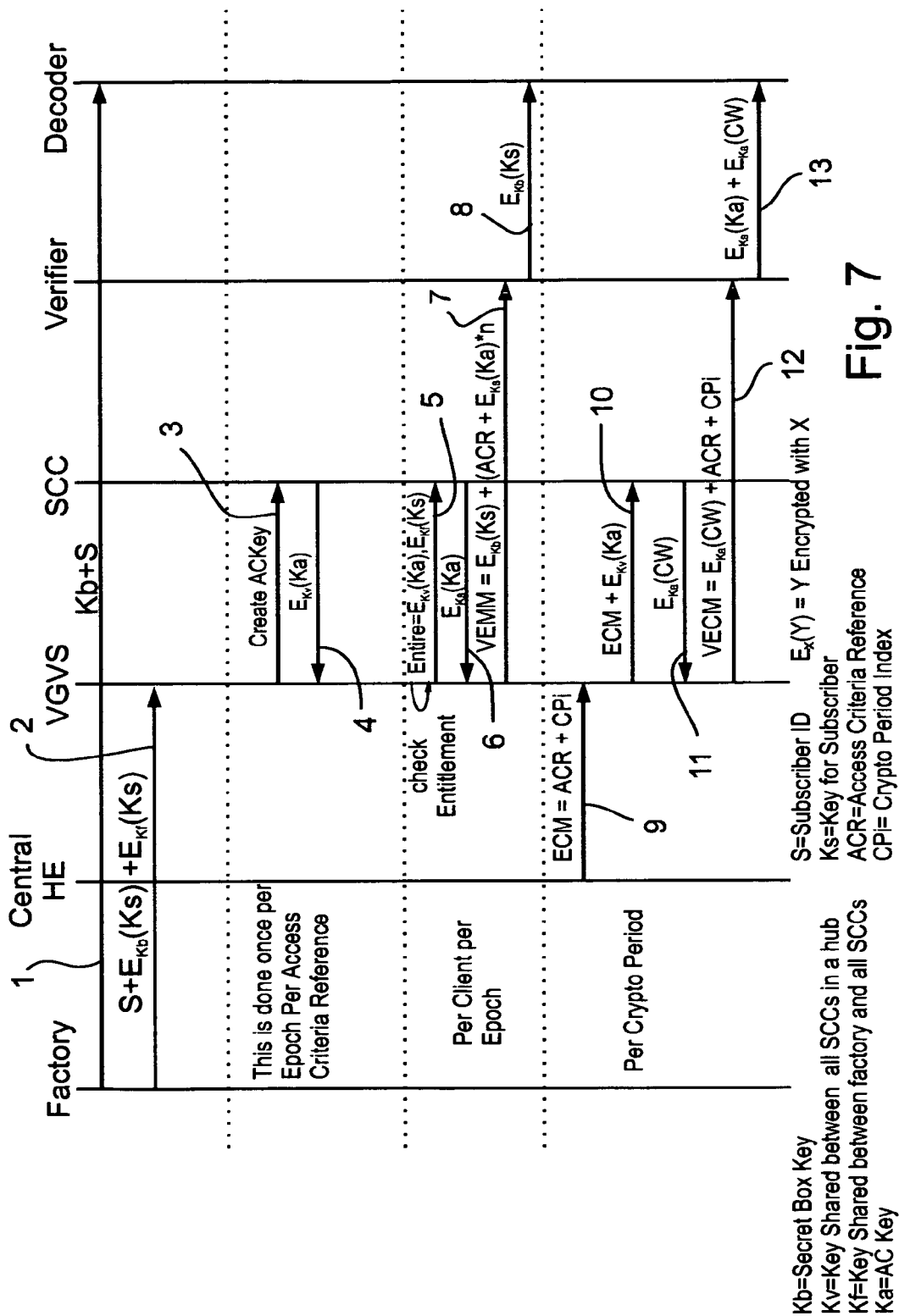
FIG. 7 shows an exemplary flow diagram of the operation of a preferred embodiment according to the present invention.

FIG. 7 shows an exemplary flow diagram of the operation of a preferred embodiment according to the present invention. At the top of the diagram, six different locations are given at which one or more actions may occur. These may include, as shown, the "factory" (where the recipient module, such as a set-top box, is manufactured); the central HE (head-end); the security server, labeled as "VGVS"; the smart card chip, labeled as "SCC"; and the recipient module, shown as two separate components, the verifier and the decoder, for the purposes of explanation only and without any intention of being limiting. Arrows show the flow of operations between locations, and are given in sequential order of the operations as they are performed. Each arrow is labeled with a number and described in greater detail below.

Arrow 1 shows the secret (Kb) and optionally an identifier for the recipient module (S) being installed at the factory into the decoder portion of the recipient module. The decoder actually decrypts keys and accesses the protected content.

Arrow 2 indicates that the security server is provided with a subscriber key (Ks), encrypted with the secret to form an encrypted subscriber key. Optionally, the security server is provided with a second encrypted subscriber key, which has been encrypted with a known key to the server, thereby enabling the security server to obtain an unencrypted subscriber key. The known key may optionally be shared between the factory and all of the smart card chips (Kf). Also optionally, the security server receives the identifier of the recipient module.

Arrows 3 and 4 are preferably performed once per "epoch", a predetermined period of time which may optionally and preferably be a day or a portion thereof. Arrow 3 shows the security server sending a request to the smart card chip, to create an access key (Ka). Arrow 4 shows the smart card chip sending the access key back to the security server, preferably encrypted with a key (Kv) that is shared between all of the smart card chips controlled by the security server. Optionally and more preferably, arrows 3 and 4 are repeated for each set of access criteria, according to an access criteria reference.

The processes shown with regard to arrows 3 and 4 optionally and preferably include communication between the smart card chip and the virtual smart card (not shown; see FIG. 3). The virtual smart card optionally sends a request to the smart card chip, to generate the access key (Ka). The smart card chip then generates the access key, and preferably encrypts it with the shared key Kv. This encrypted access key is then returned to the virtual smart card, which passes it to the security server.

Arrows 5, 6, 7 and 8 are also preferably performed once per "epoch", for each subscriber (client). Before arrow 5, as indicated the security server checks the entitlement of the subscriber for particular type(s) of content. As arrow 5 shows, the security server then sends the access key (Ka), again preferably encrypted with the shared key Kv, and the subscriber key (Ks), preferably encrypted with the shared factory key (Kf), to the smart card chip. The smart card chip then returns Ka encrypted with Ks to the security server, in arrow 6. In arrow 7, the security server creates a VEMM, containing an access criteria reference and an encrypted access key (Ka encrypted with Ks) for each portion or item of protected content for which the recipient module is entitled to access. The security server also preferably sends Ks encrypted with Kb as part of the VEMM. In arrow 8, the verifier disassembles the VEMM, and sends Ks encrypted with Kb to the decoder.

Arrows 9, 10, 11, 12 and 13 are preferably performed once per cryptographic period, which may optionally be in the order of seconds or minutes, etc. In arrow 9, the head-end sends an ECM, containing the access criteria reference and the cryptographic period index (crypto-period index), to the security server. The ECM also contains the control word (CW), which is necessary for accessing the protected content that is being transmitted by the head-end. In arrow 10, the security server sends the ECM with the access key (Ka), preferably encrypted with Kv, to the smart card chip. In arrow 11, the smart card chip returns the control word, preferably encrypted with the access key (CW encrypted with Ka), to the security server.

These processes may also optionally be performed with communication between the virtual smart card and the smart card chip as follows. The virtual smart card preferably receives the ECM from the security server, and passes the ECM, optionally with the encrypted access key, to the smart card chip. Since the smart card chip originally generated the access key in this embodiment, optionally only the ECM is sent to the smart card chip. The smart card chip then preferably returns the encrypted control word, encrypted with the access key, to the virtual smart card.

Alternatively and more preferably, the virtual smart card selects a random number to be the encrypted access key. This random number is then sent to the smart card chip, which more preferably performs the decryption process on the random number with the shared key Kv. Since the process of encrypting a random number typically yields another random number, the smart card chip is able to derive a random number that can be used as the access key, even if the smart card chip did not originally generate the access key. The derived random number is then preferably used as the access key to encrypt the control word.

In arrow 12, the security server prepares a VECM, containing the encrypted control word, the access criteria reference and the crypto-period index, for being sent to the verifier. In arrow 13, the verifier sends the previously received encrypted access key and the encrypted control word to the decoder.

Figure 8:
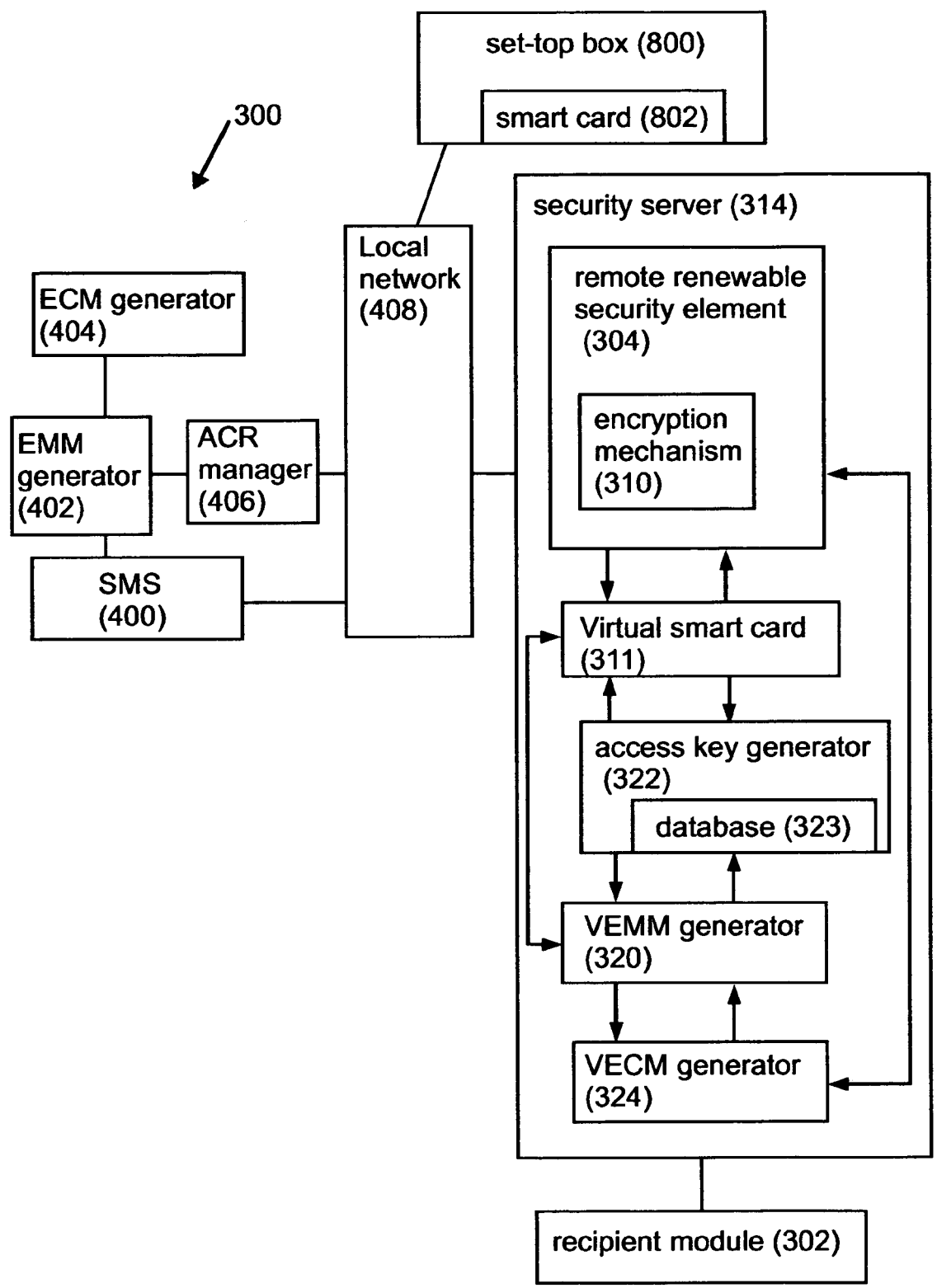
FIG. 8 shows an exemplary implementation of the system according to the present invention, which includes a background art implementation of the set-top box in a mixed system.

FIG. 8 shows an optional but preferred implementation of system 300, in which background art implementations of the set-top box are present in a mixed system, with recipient module 302 and other components from FIG. 3. Unless otherwise indicated, all components that have the same reference numbers as for FIG. 3 have identical functions.

As shown, system 300 now also features a background art set-top box 800, with a background art smart-card 802 that is preferably located at the same physical location. For example, smart-card 802 may optionally be inserted into a slot in set-top box 800. Set-top box 800 is preferably directly connected to local network 408 in order to receive the EMM from EMM generator 402. Smart-card 802 is then preferably able to process the EMM, to determine whether the subscriber is entitled to the content to which the EMM refers, and also to receive the access key.

Both set-top box 800 and recipient module 302 preferably also receive the ECM from the head-end broadcasting component (not shown), which may optionally be some type of MUX (multiplexer). More preferably, the ECM is received with the broadcast protected content.

One advantage of such a mixed system is that legacy (background art) set-top boxes 800 may optionally be used in conjunction with recipient module 302, such that previously installed set-top boxes 800 would not necessarily need to be removed.

Figure 9:
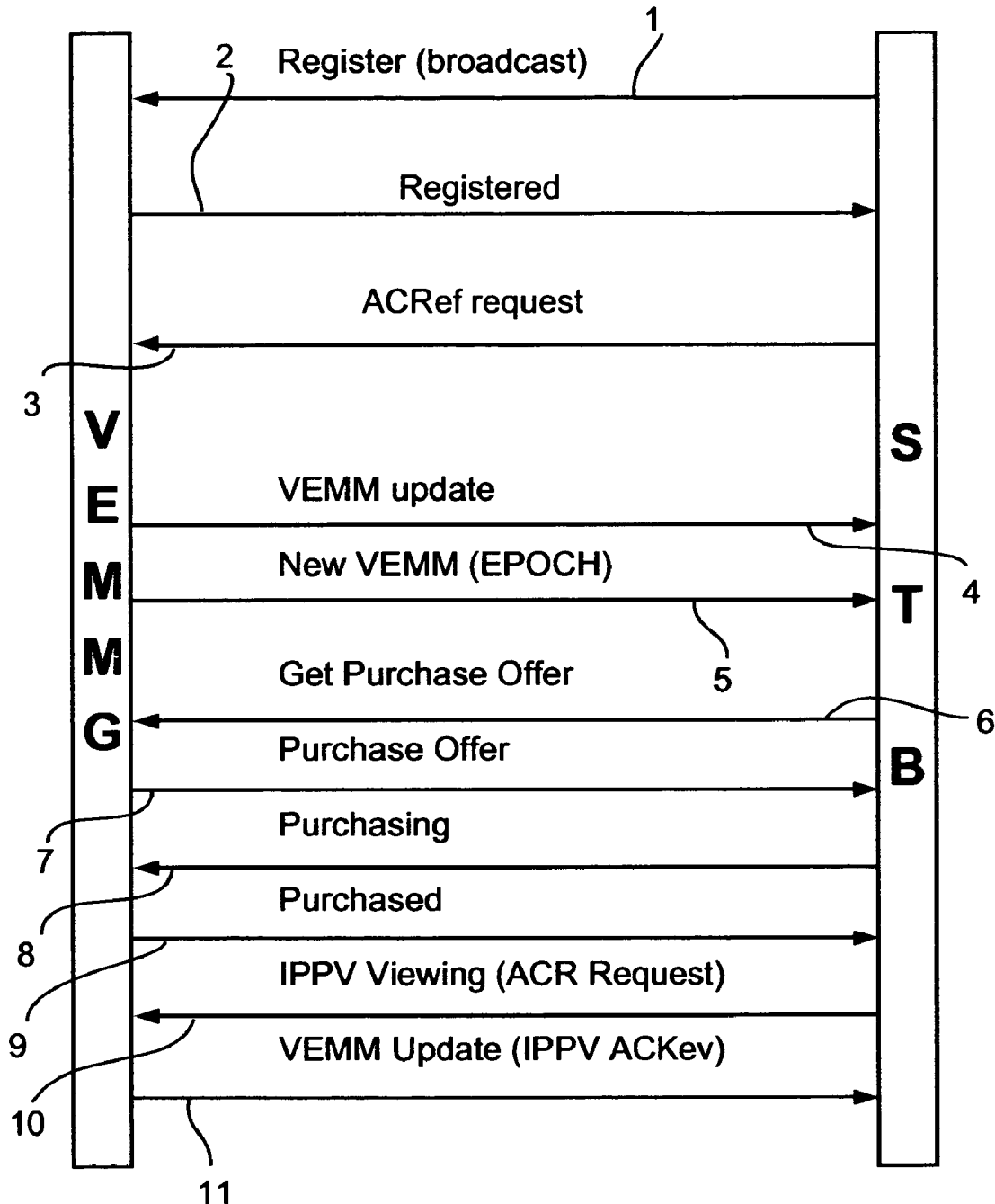
FIG. 9 shows an exemplary communication flow between the VEMM generator and the recipient module according to the present invention.

FIG. 9 shows an exemplary communication flow between the VEMM generator (VEMMG) and the recipient module (STB) according to the present invention. As shown, preferably the recipient module sends a request for registration, which may optionally be broadcast (arrow 1). Next, the VEMM generator responds by acknowledging the registration (arrow 2).

The recipient module then optionally sends a request for a reference to one or more access criteria (arrow 3). The VEMM generator responds by sending an updated VEMM (arrow 4) or a new VEMM (arrow 5). Alternatively, the VEMM generator may send the VEMM without the request from the recipient module.

The recipient module then optionally and preferably requests a purchase offer, as shown in arrow 6. The purchase offer is sent from the VEMM generator to the recipient module (arrow 7), which may optionally respond with a purchase request (arrow 8). The purchase is then preferably acknowledged by the VEMM generator (arrow 9).

For IPPV (impulse pay per view), the recipient module preferably requests the content by sending the access criteria reference for the content, for example, from an ECM which may have been broadcast by the head-end (arrow 10). The VEMM generator then responds with the appropriate VEMM, which contains the encrypted access key, if the recipient module is entitled to receive the content (arrow 11).

Figure 10:
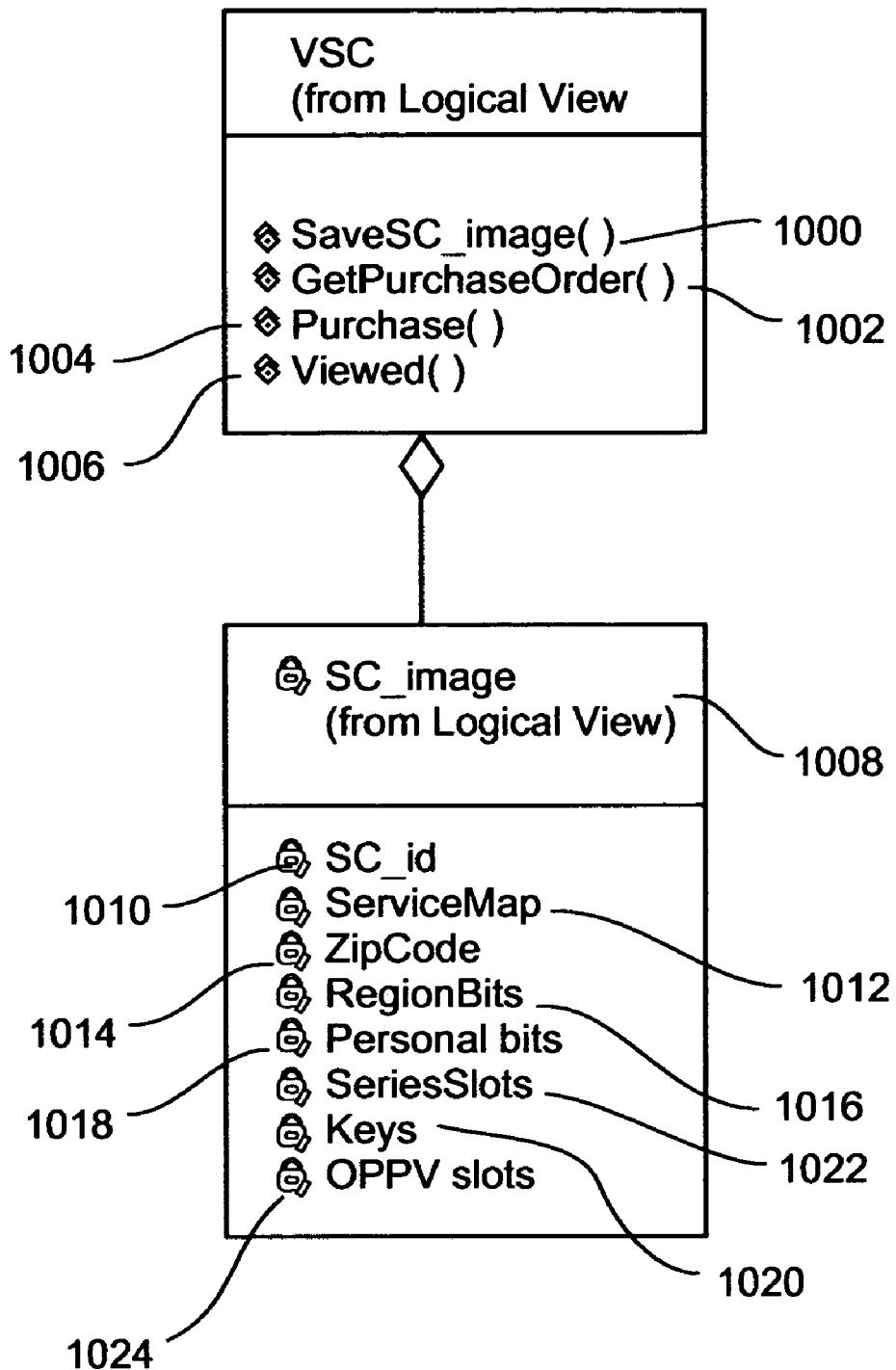
FIG. 10 shows an exemplary virtual smart card image structure according to the present invention.

FIG. 10 shows an exemplary smart card image structure according to the present invention. The smart card image optionally and preferably determines the subscriber information that is provided to the virtual smart card for determining entitlements. Preferably, the image is stored on the smart card chip or other remote renewable security element. As shown, the virtual smart card preferably has a number of functions for altering information on the smart card image, including a function 1000 for saving the smart card image; a function 1002 for receiving the purchase order, a function 1004 for purchasing the content and a function 1006 which indicates that the content has been viewed, or otherwise used by the subscriber.

A smart card image 1008 may optionally contain such information as a smart card identifier 1010, a service map 1012 (which optionally and preferably indicates which services, such as which channels for example, the subscriber is entitled to receive), one or more types of information for indicating the subscriber location (shown as a zipcode 1014 and a RegionBits 1016 as non-limiting examples), and information about the subscriber 1018. Smart card image 1008 preferably contains information about keys 1020.

Optionally and preferably, smart card image 1008 also contains one or more SeriesSlots 1022, which is a wallet for optionally purchasing PPV (pay per view) items, and one or more OPPV slots 1024, related to the purchase of pay per view content items in advance.

The information for smart card image 1008 is preferably prepared when the SMS sends information about the subscriber to the EMM generator. The EMM generator then preferably translates this information into the data required for smart card image 1008.

While the invention has been described with respect to a limited number of embodiments, it will be appreciated that many variations, modifications and other applications of the invention may be made.

What is claimed is:

1. A system for secure transmission of protected content, the system comprising:
    a head-end operative to send entitlement information controlling access to the protected content;
    a security server;
    a plurality of recipient modules comprising:
        a first plurality of security-element recipient modules; and
        a second plurality of non-security-element recipient modules, said first plurality of security-element recipient modules differing from said second plurality of non-security-element recipient modules in that each of said first plurality of security-element recipient modules includes a smart card operative to process the entitlement information received from the head-end and to produce therefrom a key for accessing the protected content; and
    a secure communication channel for supporting communication between said security server and at least one of said plurality of recipient modules, wherein
    the head-end sends the entitlement information both to the security server and to at least some of the plurality of recipient modules, and
    in a first mode of operation, at least one of the second plurality of non-security-element recipient modules receives a first key in a multiple key hierarchy via said secure communication channel, and
    in a second mode of operation, said at least one of the non-security-element recipient modules receives the protected content and an encrypted key, said encrypted key being a second key in said multiple key hierarchy, said at least one of the non-security-element recipient modules being operative to utilize the first key to decrypt the encrypted key to form a decrypted key, said at least one of the non-security-element recipient modules only being capable of accessing the protected content with said decrypted key, and
    said first key and said second key are prepared by said security server based, at least in part, on the entitlement information sent by the head-end.

2. The system according to claim 1, wherein said first key is contained in a VEMM, said VEMM further comprising an access criteria reference for determining whether said at least one of the non-security-element recipient modules is entitled to access the protected content, said VEMM being prepared by said security server based, at least in part, on the entitlement information sent by the head-end.

3. The system according to claim 2 and wherein said VEMM is sent upon request by said at least one of the non-security-element recipient modules.

4. The system according to claim 3 and wherein said request includes an access criteria reference.

5. The system according to claim 3 and wherein said request is initiated in response to an impulse pay per view (IPPV) request by a user.

6. The system according to claim 2, wherein said access criteria reference for each item of protected content is associated with a separate access key.

7. The system according to claim 2, wherein said encrypted key further comprises an encrypted control word.

8. The system according to claim 7, wherein said encrypted control word is contained in a VECM, said VECM further comprising an access criteria reference for identifying said first key for decrypting said encrypted control word by said at least one of the non-security-element recipient modules, said VECM being prepared by said security server based, at least in part, on the entitlement information sent by the head-end.

9. The system according to claim 8, wherein said secure communication channel further comprises a subscriber key, such that said first key is encrypted with said subscriber key for being transmitted to said at least one of the non-security-element recipient modules, and such that said at least one of the non-security-element recipient modules is capable of decrypting said subscriber key.

10. The system according to claim 8, wherein said secure communication channel comprises a second plurality of secure communication channels each associated with one of the second plurality of non-security-element recipient modules, and
    each of the secure communication channels further comprises a subscriber key of the associated one of the non-security-element recipient modules, such that said first key is encrypted with said subscriber key for being transmitted to said one of the non-security-element recipient modules, and such that only said one of the non-security-element recipient modules is capable of decrypting said subscriber key.

11. The system according to claim 9, wherein said one of the non-security-element recipient modules further comprises a secret, said secret being required for decrypting said subscriber key, and said secret comprising a part of said secure communication channel.

12. The system according to claim 11, wherein said one of the non-security-element recipient modules comprises at least one permanent read-only storage medium for storing said secret.

13. The system according to claim 12, wherein said secret is permanently stored on said at least one permanent read-only storage medium during manufacture of said one of the non-security-element recipient modules.

14. The system according to claim 12, wherein said one of the non-security-element recipient modules comprises at least one generic chip, said at least one generic chip comprising said at least one permanent read-only storage medium for storing said secret.

15. The system according to claim 11, wherein said security server receives said subscriber key encrypted with said secret and an unencrypted subscriber key, but wherein said security server does not receive said secret.

16. The system according to claim 2, wherein said head-end sends an Entitlement Management Message (EMM) to said security server, for providing said access criteria reference to said security server.

17. The system according to claim 16, wherein said head-end sends at least information for generating said control word to said security server in an Entitlement Control Message (ECM).

18. The system according to claim 17, wherein said head-end also sends said ECM to at least one of the security-element recipient modules.

19. The system according to claim 17, wherein a different VEMM is transmitted periodically.

20. The system according to claim 19, wherein a different VEMM is transmitted if said at least one of the non-security-element recipient modules is off-line for at least a predetermined period of time.

21. The system according to claim 17, wherein said VEMM is unicast to each of a subset of said plurality of recipient modules.

22. The system according to claim 17, wherein said security server comprises a remote renewable security element for storing said subscriber key and for providing said encrypted first key and said encrypted control word to said security server.

23. The system according to claim 22, wherein said subscriber key at said remote renewable security element is capable of being renewed.

24. The system according to claim 22, wherein said remote renewable security element further comprises a hardware component and a software component.

25. The system according to claim 24, wherein said software component determines one or more entitlements for permitting said VEMM to be generated for said at least one of the non-security-element recipient modules.

26. The system according to claim 24, wherein said hardware component encrypts said access key and said control word.

27. The system according to claim 22, further comprising a plurality of said remote renewable security elements, and further comprising a broadcaster of the protected content for controlling said plurality of said remote renewable security elements.

28. The system according to claim 22, wherein a plurality of said remote renewable security elements is controlled by said security server.

29. The system according to claim 28, wherein said security server and said plurality of remote renewable security elements share a server key for at least decrypting at least said access key.

30. The system according to claim 29, wherein said security server generates said access key in an encrypted form as an encrypted access key, and wherein said remote renewable security element decrypts said encrypted access key to form said access key according to said server key.

31. The system according to claim 22, wherein at least some of said plurality of recipient modules each comprise a set-top box.

32. The system according to claim 1 and wherein at least one of said security server and said secure communication channel is implemented with redundant components.

33. The system according to claim 1 and wherein the server comprises:
(a) a remote renewable security element;
(b) an entitlement message generator; and
(c) a control word message generator, and
   the protected content is broadcast by the head-end, the head-end providing an access criteria reference and a control word for accessing the protected content, and
   said entitlement message generator receives the access criteria reference from the head-end and queries said remote renewable security element to determine whether the at least one of the non-security-element recipient modules is entitled to receive the protected content, such that if the at least one of the non-security-element recipient modules is entitled to receive the protected content, said entitlement message generator generates a VEMM comprising an encrypted access key and the access criteria reference, and
   if the at least one of the non-security-element recipient modules is entitled to receive the protected content, said control word message generator receives the control word from the head-end and generates a VECM comprising an encrypted control word, such that the at least one of the non-security-element recipient modules cannot access the protected content without said VEMM and said VECM.

34. The system according to claim 1 and wherein the server comprises:
(a) a remote renewable security element for determining whether the at least one of the non-security-element recipient modules has at least one entitlement to the protected content;
(b) a VEMM generator for generating a first message containing a first key, said VEMM generator only generating said first message if the at least one of the non-security-element recipient modules has said at least one entitlement; and
(c) a VECM generator for generating a second message containing a second key, said second key being encrypted with said first key, wherein the protected content is only accessible according to said second key.

* * * * *